United States Patent Office 2,716,237
Patented Aug. 23, 1955

2,716,237

PRODUCTION OF ENDO-DEXTRANASE BY ASPERGILLUS WENTII

Virginia Whiteside-Carlson and Warner W. Carlson, Birmingham, Ala., assignors to The Commonwealth Engineering Company of Ohio, Dayton, Ohio No Drawing. Application January 28, 1953, Serial No. 333,844

7 Claims. (Cl. 195—31)

This invention relates to the production of dextran of predetermined, relatively low molecular weight from a dextran of relatively high molecular weight.

Dextran, a long chain polymer classifiable as a polysaccharide, may be produced by biosynthesis by the action of microorganisms such as *Leuconostoc mesenteroides* or *L. dextranicum* on a suitable sucrose-bearing medium, and, as produced initially, normally has a molecular weight higher than is desirable for many purposes such as for use as an anti-shock agent or blood plasma extender.

Heretofore, the efforts to change the normally initially high molecular weight of dextran to a molecular weight in a desired, lower range have been presented with great difficulty. Prior to our invention, the art was forced to rely on acid hydrolysis with a succession of treatments successively to reduce the molecular weight to the approximate weight range desired. When the approximate result was secured, it was still a matter of considerable uncertainty, first, as to the weight and, second, uncertainty due to the fact that the dextran produced by the acid hydrolysis was not of any one particular weight but an average of a wide variety of weights. This has led to therapeutic problems because of the uncertainty as to the exact molecular weight or the average molecular weight of the dextran to be used in a 6% saline solution for intravenous injections as a blood plasma extender. The unsolved problem in the art was for a quick, economical and accurate method of automatically producing dextran of a desired molecular weight. Although this problem has been the subject of wide investigation, it remained unsolved prior to our invention.

We are concerned here with hydrolysis or splitting of dextran by the action of an enzyme which may be broadly defined as a dextranase. It may be noted that dextranases may now be classified into three types as follows: (a) dextranases which attack all linkages of the polymer molecule with equal ease regardless of their location in the polymer chain; (b) exo-dextranases which have a preference for linkages near the ends of the polymer chains; and (c) endodextranases which have a preference for linkages remote from the ends of the polymer chains.

Prior to our invention, enzymes capable of hydrolyzing dextran in any practical fashion were unknown and, in fact, enzymes that might have the capacity to hydrolyze dextran were distributed very sparsely in nature, and the two enzymes which had been found capable of hydrolyzing dextran were subject to the same objections as acid hydrolysis, namely, they were inaccurate in their action and required a very long time to secure a result, which result was clouded by uncertainty as to the exact molecular weight, or average molecular weight of the hydrolysis product, which varied to such a degree that a standardized product was impossible.

It will be understood that the mere ability to attack dextran is in itself no proof that a given mold will be useful in forming an enzyme capable of changing the molecular weight of the dextran to thereby yield a commercially valuable or therapeutically useful product. For instance, an enzyme may either: (1) attack dextran directly and utilize the sugar residues for the formation of fermentation products such as alcohol, lactic acid, etc., or (2) hydrolyze the dextran from the ends of the chains, liberating the units as free glucose. In contrast, to be useful for our purposes, the enzyme must hydrolyze the long chain of glucose units comprising the dextran molecule by attacking those chains along their length in such a way as to produce fragments with molecular weights in the desired range. To produce this result, the mold and the conditions of its cultivation must be such that the enzyme having the desired capacity is formed and at a reasonable speed.

We found that if a mold of a strain of *Aspergillus wentii*, is cultivated in a selected medium under prescribed conditions so that it is amino acids-stimulated and dextran-acclimated, there is obtained a dextran-acclimated enzyme (or mixture of enzymes) of endo-dextranase type (i. e., an enzyme or mixture of enzymes having a preference for the bonds or linkages deep within the polymeric molecular structure) which, mixed with an aqueous medium comprising dextran to be split, acts to split the dextran into fragments the molecular weight of which can be predetermined and controlled by control and correlation of the pH, time and temperature conditions under which the mixture is maintained.

This present invention is more particularly concerned with the cultivation of the selected mold and it is an object thereof to provide a medium having a composition such that, under controlled, critical pH conditions, the endodextranase is produced rapidly and in optimum yield.

Proper cultivation of the mold to produce optimum yields of the endo-dextranase presented us with a new problem for, as will be understood, the molds exhibit a more or less pronounced specificity or sensitivity as to environment and the mere fact that one type or class of mold flourishes in a given nutrient medium and under given pH conditions does not mean that a different mold or strain will grow in the same or even a similar nutrient medium or under the same set of conditions.

One discovery we made in the problem of cultivating our strain of *Aspergillus wentii* was that all enzyme media useful for preparing water solutions of dextran are not practical for the cultivation of our mold. One condition is essential to successful cultivation of our *Aspergillus wentii*, and that is a pH for the medium of between 7.0 and 7.5. We found that the pH is critical to the rapid production of our endo-dextranase and, therefore, in the ultimate sense, to the splitting of dextran on a practical, large-scale basis. Indeed, we find that the mold is particularly sensitive to pH conditions and the control of the pH has been found to be critical to the production of the endodextranase at all, regardless of rate. Thus, we have found that *Aspergillus wentil* grows poorly, if at all, at pH 5.0, will not grow at all at pH 3.5, and has an optimum pH range of growth between neutrality and slightly on the alkaline side, i. e., between 7.0 and 7.5. This is a further differentiating characteristic of our mold as compared to other Aspergilli which characteristically grow best at a pH in the acid range.

On the other hand, our endo-dextranase has its maximum activity as dextran splitting or hydrolyzing agent at a pH between about 4.0 and 4.5. In determining the conditions required for cultivation of our *Aspergillus wentii*, therefore, we were confronted with the fact that, in contrast with the acid pH range suitable for the cultivation of other Aspergilli, our mold requires neutral or slightly alkaline conditions unusual for Aspergilli, and the pH required for the production of the endo-dextranase is higher than the pH at which the endo-dextranase subsequently exhibits its maximum activity.

Our neutrient medium for the cultivation of our *Aspergillus wentii* also preferably contains, for the purpose of stimulating early growth and rapid enzyme production from about 2.0 to about 6.0 gms. of peptone or an equivalent amount of amino acids or other amino acid source, e. g., other protein hydrolysate, per liter of the medium.

Briefly, we grow our mold, a strain of *Aspergillus wentii*, in an aqueous nutrient medium maintained at pH 7.0 and 7.5 and comprising metallic salts and, preferably, a source of amino acids such as peptone in at least the minimum amount stated. The medium may be further enriched with vitamins, particularly B-vitamins in the complex form, and also contains a small amount of dextran sufficient to acclimate the endo-dextranase so that it will be adapted to and tolerant of the dextran to be split at a subsequent stage when the endo-dextranase is associated with dextran in large quantities. Preferably, dextran is present in the medium in which the mold is grown in an amount between 5.0 gms. and about 50.0 gms. thereof per liter of medium.

The endo-dextranase may be separated from the nutrient medium in which the mold is grown by filtration and the filtrate containing the endo-dextranase in solution may be added directly to the medium containing dextran to be split. Or the endo-dextranase may be precipitated from the filtrate and the precipitate added to the dextran to be split. We have found that it is possible to precipitate the endo-dextranase from solution by adding acetone to the clear mold filtrate to yield an acetone concentration in the range of from approximately 35% to 55%. The precipitate, a white powder, may then be collected and added as such, or in aqueous solution, to the medium containing the dextran to be split. We have also used other methods to isolate the endo-dextranase. For instance, we have precipitated it by means of organic solvents, such as dioxane and alcohols. We have also used inorganic salts such as ammonium sulfate, sodium sulfate and sodium chloride, to "salt-out" the endo-dextranase from the filtrate. For example, we have obtained a highly potent concentrate of our endo-dextanase by (a) filtering the nutrient to remove the mold mat; (b) adding ammonium sulfate to the filtrate at the level of 70 grams thereof per 100 cc. of filtrate and recovering the resulting precipitate; (c) re-dissolving the endo-dextranase-containing precipitate in an amount of water corresponding to approximately one-tenth the original volume of the filtrate of (b); (d) re-precipitating the endo-dextranase with ammonium sulfate; (e) repeating the cycle of dissolving the enzyme in water and precipitating it with ammonium sulfate several times, continuing to decrease the volume of solution involved; (f) dialyzing the final solution to remove extraneous salts; (g) precipitating the endo-dextranase by adding acetone to a concentration of approximately 70%; and (h) drying the resulting precipitate to obtain the endo-dextranase as a stable, highly potent powder. Alternatively, the final, dialyzed solution may be freeze-dried to yield the enzyme as a stable, active powder.

We have classified the mold which, when grown in a nutrient medium comprising, as an essential ingredient, amino acids or a source of amino acids, such as peptone, yields our endo-dextranase as a strain of *Aspergillus wentii*. For purposes of identification, we studied its growth on Czapek sucrose agar, the standard medium used in mold classification work. On this medium our mold produces colonies which grow rapidly, with the aerial mycelium forming dense floccose masses. The growth is cottony white for three or four days, then turns a grey color with an absence of green tones. On further incubation the growth becomes dense and furry in varying shades of grey, slowly deepening and changing to a brown. When the culture is fully developed it is coffee-colored. The reverse of the culture passes through shades of yellow and green, finally becoming distinctly reddish, although small patches of yellow and green may persist. The substratum is transfused with a yellow pigment. Conidial heads are large and coffee-colored when mature, radiate, with only a slight tendency towards splitting. Conidiophore walls are smooth and almost colorless. Vesicles are globose and typically fertile over the entire surface. Sterigmata are typically in two series, bearing chains of conidia which are globose, yellow-brown, roughened and echinulate. Neither perithecia nor sclerotia have been observed.

By comparison of these characteristics with those reported by standard authorities for the various species of the genus Aspergillus, it is apparent that our mold approaches, but does not coincide in all specific details, with the descriptions given for perfect *Aspergillus wentii*. This mold, *Aspergillus wentii* was given by Thom and Roper, in "Manual of the Aspergilli," published by The Williams & Williams Co., Baltimore, Md., 1945, The mold cultivated under our conditions for elaboration of the dextranase is essentially the same as the mold on file with the American Type Culture Collection under the designation ATTC 1023.

By cultivating our mold in the nutrient medium described herein, we achieved an unexpectedly rapid development of the special type enzyme, an endo-dextranase, capable of definitely reducing the size of the molecules of dextran polymer with accuracy and within a reasonable length of time, so that the endo-dextranase can be produced quickly and in large quantities. The endo-dextranase is very potent and results in the production of dextran of predetermined desired molecular weight with the requisite accuracy and speed when very small amounts thereof are used in high dilutions. The filtrate containing the endo-dextranase may be employed in dilutions ranging from 1:100 to 1:1000 (e. g., 0.1 cc. of the filtrate added to 100 cc. of the medium containing dextran to be split. A dilution of 1:1000 with reaction time periods from 1 to 5 hours represents satisfactory conditions of operation. However, satisfactory results are obtained when the ratio of filtrate to medium containing dextran to be split is between 1:10,000 and 1:100,000, although the reaction period must then be lengthened accordingly.

After the endo-dextranase is mixed with the medium containing dextran to be split, such as fermented sucrose medium, the mixture is incubated under controlled conditions of pH time and temperature to allow the splitting to proceed until fragments or segments having the predetermined molecular weight are produced. These conditions may be selected and correlated within relatively wide limits to accomplish the results desired. As an example, the mixture of endo-dextranase and medium containing dextran to be split may be incubated at room temperature for 3.5 to 5.0 hours, the pH being maintained at 4.0–4.5, to produce dextran having a molecular weight in the range suitable for use as an anti-shock agent or blood plasma extender.

When it is desired to stop the action of the endo-dextranase during the splitting operation, this can be done by either adjusting the pH of the mixture to a value of 9–10, or by adjusting the pH to around 2–3. This alkalizing or acidifying of the mixture is purely for stopping the endo-dextranase action and is not for reaction or degradation purposes.

After the endo-dextranase action has proceeded to the point that the dextran has the desired molecular weight, the resulting solution may be purified by fractionation, for example, by (1) making the solution approximately 0.1 normal in alkali or acid and heating for a period of 5–15 minutes until a flocculent precipitate appears; (2) neutralizing the solution: (3) adding a filtration aid such as "Celite" (Johns Mansville); and (4) filtering the solution. The thus purified solution may then be fractionated.

if that step is necessary or desirable. It should be pointed out that if treatment with acid is employed, care should be taken to use mild treating conditions in order to avoid further hydrolysis of the dextran. Even with this limitation, it is more desirable to use acid, since heating in alkaline solution always tends to darken carbohydrates.

An alternative method of purification equally as effective on the hydrolyzed dextran involves (1) treating the endo-dextranase-degraded mixture with alumina gel; (2) centrifuging; (3) precipitating with alcohol to a concentration of 55%; (4) redissolving the precipitate in water. Filtration with the use of an aid such as "Celite" then removes all remaining traces of turbidity and water-clear solutions are obtained.

The following examples illustrate specific embodiments of the invention.

EXAMPLE I

An aqueous nutrient medium (medium PV) was prepared by mixing the following components with water:

Table 1

MEDIUM PV

| Component | Grams/liter |
| --- | --- |
| Peptone | 5.0 |
| Dextran-salts Solution: | |
| Dextran | 10.0 |
| $MgSO_4$ | 0.1 |
| NaCl | 0.1 |
| $FeSO_4$ | 0.01 |
| $MnSO_4$ | 0.01 |
| $KH_2PO_4$ | 0.1 |
| Sodium acetate | 2.0 |
| Potassium acetate | 0.5 |
| | |
| B-Vitamins: | Milligrams/liter |
| Nicotinic acid | 1.0 |
| Riboflavin | 0.5 |
| Thiamine | 0.5 |
| Ca pantothenate | 0.5 |
| Pyridoxine | 0.5 |
| Folic acid | 0.4 |
| Biotin | 0.01 |
| | 0.001 |

The pH of this medium was maintained at 7.0–7.5. A strain of *Aspergillus wentii* was introduced into the medium and the mixture was held at room temperature for about 80 hours, when a solution rich in our endo-dextranase was obtained.

The metallic salts set forth in the table of Example I may be used, in general, in amounts such that the total metallic salt content of the medium is between about 2.0 and 5.0 gms./liter. The B-vitamins may be used in the form of the commercially available complexes having varying potency. The total amount of complex containing the factors set forth in the example which is used may be from about 2.5 milligrams of complex per liter of nutrient to about 5.0 milligrams of complex per liter.

EXAMPLE II

A medium was prepared as in Example I, except that the B-vitamins (synthetic) were omitted. Our *Aspergillus wentii* was grown in the medium to obtain a solution rich in our endo-dextranase. The solution was filtered and used for splitting dextran, both with and without precipitation of the endo-dextranase from the filtrate.

EXAMPLE III

A medium was prepared as in Example I, except that the B-vitamins were replaced by yeast extract in an amount of 0.4 gram/liter of nutrient. Our *Aspergillus wentii* was cultivated in the medium under the conditions of Example I and a solution rich in our endo-dextranase was produced.

EXAMPLE IV

There was prepared a medium as in Example I, but in which the peptone of the latter example was replaced by casein hydrolysate in an amount of 5.0 grams/liter. By cultivation of our strain of *Aspergillus wentii* in this medium, at pH 7.0–7.5, our endo-dextranase was produced at high speed and in large amount.

EXAMPLE V

Our strain of *Aspergillus wentii* was cultivated in a nutrient medium as in Examples I and IV, but in the absence of the B-vitamins, to produce a solution rich in the endo-dextranase.

EXAMPLE VI

Samples of our *Aspergillus wentii* were cultivated separately in different nutrient media having the composition of the medium of Example I but in which the concentration of dextran varied from 5.0 to 50.0 grams/liter to obtain endo-dextranase solutions.

The endo-dextranase obtained as above was introduced into the presence of dextran to be split. It attacks the dextran molecule at linkage points remote from end-groups to transform the large molecules into relatively low molecular weight, low viscosity products. A secondary, very slow reaction then ensues during which the enzyme slowly attacks these low molecular weight products. In other words, our enzyme attacks the smaller fragments produced during the hydrolysis less readily than it attacks the original larger molecules present at the beginning of the hydrolysis. That is to say, our enzyme has a preference for linkages deep within the dextran molecule and, as the hydrolysis proceeds and increasingly smaller fragments are produced for the enzyme to work on, the reaction proceeds at slower and slower rates. This is demonstrated by the following data obtained by adding a purified, highly potent preparation of our enzyme in a dilution of 1:100 to a solution of dextran and observing the resulting viscosity changes.

| Time after Mixing (Minutes) | Relative Viscosity (Compared to Water) |
| --- | --- |
| 0 | 7.25 |
| 2 | 4.69 |
| 3.5 | 4.09 |
| 4.5 | 3.77 |
| 6 | [1] 3.62 |
| 7.5 | 3.47 |
| 9 | 3.36 |
| 11.5 | 3.25 |
| 40 | 2.77 |
| 58 | 2.61 |
| 1,498 | [2] 1.77 |
| 2,938 | 1.70 |

[1] 50% reduction in viscosity.
[2] 75% reduction in viscosity.

In the example given, the relative viscosity was reduced to 50 per cent of the original value in only 6 minutes, while an additional 1492 minutes were required to drop the relative viscosity of this intermediate solution by 50 per cent (or to 25 per cent of the original value). Little further change was noted during an additional 1440 minutes. It can be shown mathematically that the results obtained would be impossible if it be supposed that our dextranase attacks all glycosidic linkages in the dextran molecule with the same probability. The results can be explained only by the hypothesis that the end-groups of the polysaccharide chains in the dextran molecule in some manner disturb or hinder the union of dextran with the enzyme and hence decrease the velocity of hydrolysis. By contrast, union of the enzyme with glycosidic linkages remote from end-groups must take place with great ease, resulting in rapid rupture of the large dextran molecule into smaller fragments. When only these smaller fragments remain, the enzyme then attacks them, although only slowly and with difficulty. This proves that our enzyme is an endo-dextranase.

We give below examples illustrating the use of our endo-dextranase in the production of dextran of predetermined molecular weight as the result of enzymatic hydrolysis of dextran of higher molecular weight by the action of the endo-dextranase.

EXAMPLE VII

A portion of the medium obtained from growth of our strain of *Aspergillus wentii* in medium PV (Example I) was filtered. One cc. of the clear filtrate was added to 110 cc. of fermented sucrose medium containing dextran in a concentration of 7 per cent. The mixture was incubated 3½ hours at room temperature. It was then transferred to a separatory funnel and treated with 50 cc. of acetone, causing the solution to separate into two liquid layers. The lower layer was drawn off and constituted fraction I of the enzymatically hydrolyzed dextran. To the solution remaining in the funnel was added 25 cc. of acetone, causing the separation of a new lower layer which was drawn off as fraction II. The addition of 50 cc. more of acetone then caused the separation of fraction III. Each of the three fractions was treated with alcohol to cause the dextran to precipitate as a white gum.

The products were dried in a vacuum oven at 70° C. to constant weight. There was thus obtained fraction I=5.0 gm.; II=1.5 gm.; and III=0.5 gm., giving a total recovery of 7 gm. of enzymatically hydrolyzed dextran out of the 7.7 gm. of raw dextran present initially. One percent solutions of the fractions were prepared and the intrinsic viscosities found to be: (where $(n)$=intrinsic viscosity)

I. $(n)=0.174;=35,000$ mol. wt.
II. $(n)=0.146;=24,000$ mol. wt.
III. $(n)=0.137;=21,000$ mol. wt.

EXAMPLE VIII

Five cc. of the mold filtrate containing the enzyme prepared as previously noted were added to 1 liter of fermented medium containing dextran in a concentration of 7 per cent. The mixture was incubated at room temperature for five hours and fractionated with acetone in a manner similar to that described previously. There was thus obtained fraction I=49 gm. and fraction II=13.2 gm., for a recovery of hydrolyzed dextran of 62.2 gm. out of the 70 gm. of raw dextran initially present. By determination of the intrinsic viscosities these were found to correspond to molecular weights of approximately I=38,000 and II=24,000.

EXAMPLE IX

To 100 cc. of fermented medium containing dextran in a concentration of 7 per cent was added 0.1 cc. of the mold filtrate containing the enzyme. It was incubated at room temperature for 4 hours and then fractionated with acetone to yield fraction I=5.9 gm. of molecular weight 69,000 and fraction II=0.7 gm. of molecular weight 21,000.

EXAMPLE X

To 8 liters of fermented medium containing dextran in a concentration of 6.1% was added 80 cc. of the mold filtrate. The viscosity of the mixture was followed at intervals. When the relative viscosity had been reduced to a value of two as determined in a No. 300 Ostwald-Fenske Viscometer, the action of the enzyme was stopped by adding alkali to a pH of 10. The time required to reach this value was 40 minutes. The mixture was clarified by treatment with alumina gel following which it was passed through the Sharples centrifuge. The solution was then precipitated with alcohol to a concentration of 55%. The white gum was redissolved in 2 liters of water, treated with Celite, and filtered. The resulting water-clear solution was precipitated with alcohol, and the white gum dried to a constant weight in a vacuum oven at 70° C. There was thus obtained 400 grams of a white product with an average molecular weight of 71,000.

The molecular weights given in Examples VII to X were calculated from the relationship between intrinsic viscosity, $\pi$, and the molecular weight of acid-hydrolyzed dextran.

It will be understood from the discussion herein that, so long as the metallic salts are present and the pH is maintained in the stated range, various changes and modifications may be made in the nutrient media specifically exemplified, both as to the ingredients and their proportions, to adapt it to rapid production of the endo-dextranase, and that, therefore, we comprehend such modifications within the appended claims.

We claim:

1. The method of producing a dextran-acclimated endo-dextranase having the capacity to split the glucosidic linkages of dextran of relatively high molecular weight initially preferentially at the linkages removed from the ends of the chains and without any substantial cleavage of depending groups which comprises growing *Aspergillus wentii* in a nutrient medium consisting essentially of an aqueous composition of matter having a controlled pH between 7.0 and 7.5 and containing dissolved metallic salts and, per liter of water, from about 2.0 gms. to about 6.0 gms. of a substance selected from the group consisting of amino acids and protein sources of amino acids, and from about 5.0 gms. to about 50.0 gms. of dextran, and isolating the endo-dextranase from the nutrient medium.

2. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and containing dissolved metallic salts and, per liter of water, from 2.0 gms. to about 6.0 gms. of peptone, and from 5.0 gms. to about 50.0 gms. of dextran, and isolating the endo-dextranase from the nutrient medium.

3. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and containing dissolved metallic salts and, per liter of water, from about 2.5 mgms. to about 5.0 mgms. of B-vitamins, from about 2.0 gms. to about 6.0 gms. of a substance selected from the group consisting of amino acids and protein sources of amino acids, and from about 5.0 gms. to about 50.0 gms. of dextran, and isolating the endo-dextranase from the nutrient medium.

4. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and containing dissolved metallic salts and, per liter of water, about 0.5 gm. of yeast extract, from about 2.0 gms. to about 6.0 gms. of peptone, and from 5.0 gms. to about 50.0 gms. of dextran, and isolating the endo-dextranase from the nutrient medium.

5. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and containing, per liter of water, a total of from about 2.0 gms. to 5.0 gms. of dissolved metallic salts, from about 2.0 gms. to about 6.0 gms. of peptone, from about 2.5 mgms. to about 5.0 mgms. of B-vitamins, from about 2.0 gms. to about 5.0 gms. of casein hydrolysate, and from about 5.0 gms. to about 50.0 gms. of dextran, and isolating the endo-dextranase from the nutrient medium.

6. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and containing, per liter of water, a total of from about 2.0 gms. to about 6.0 gms. of peptone, from about 2.5 mgms. to about 5.0 mgms. of B-vitamins, and from about 5.0 gms. to about 50.0 gms. of dextran, and isolating the endo-dextranase from the nutrient medium.

7. The method of producing a dextran-acclimated endo-dextranase having the capacity to split the glucosidic linkages of dextran of relatively high molecular weight initially preferentially at the linkages removed from the ends of the chains and without any substantial cleavage of depending groups, which comprises growing *Aspergillus wentii* in a nutrient medium consisting essentially of an aqueous composition of matter having a controlled pH between 7.0 and 7.5 and comprising a solution of components consisting essentially of the following:

| Component | Grams/liter |
|---|---|
| Peptone | 5.0 |
| Dextran-Salts Solution: | |
| Dextran | 10.0 |
| $MgSO_4$ | 0.1 |
| NaCl | 0.1 |
| $FeSO_4$ | 0.01 |
| $MnSO_4$ | 0.01 |
| $KH_2PO_4$ | 0.1 |
| Sodium Acetate | 2.0 |
| Potassium acetate | 0.5 |
| | Milligrams/liter |
| B-Vitamin: | |
| Nicotinic Acid | 1.0 |
| Riboflavin | 0.5 |
| Thiamine | 0.5 |
| Ca Pantothenate | 0.5 |
| Pyridoxine | 0.5 |
| Folic Acid | 0.4 |
| Biotin | 0.01 |
| | 0.001 | and isolating the endo-dextranase from the nutrient medium.

References Cited in the file of this patent

Evans et al.: Advances in Carbohydrate Chemistry, vol. II, pages 210, 211.

Thom et al., Manual of the Aspergilli, 1945, pages 32, 37.

Chemical Abstracts 43: 3050 i.
Chemical Abstracts 43: 4307 g.
Chemical Abstracts 44: 7832 g.